United States Patent [19]
Donati

[11] Patent Number: 5,937,455
[45] Date of Patent: Aug. 17, 1999

[54] ELECTRICALLY OPERATED TOILET WATER INLET VALVE SYSTEM HAVING A VARIABLE FILL LEVEL

[76] Inventor: William R. Donati, 161 West 16th St., New York, N.Y. 10011

[21] Appl. No.: 08/511,841

[22] Filed: Aug. 7, 1995

Related U.S. Application Data

[63] Continuation of application No. 08/227,005, Apr. 13, 1994, abandoned, which is a continuation-in-part of application No. 08/134,281, Oct. 7, 1993, abandoned, which is a continuation of application No. 07/978,814, Nov. 19, 1992, Pat. No. 5,251,346.

[51] Int. Cl.[6] .................................................. A47K 4/00
[52] U.S. Cl. ............................... 4/665; 137/426; 137/429
[58] Field of Search ........................... 4/665, 246.1, 406, 4/405; 137/412, 426, 429

[56] References Cited

U.S. PATENT DOCUMENTS

| | | | |
|---|---|---|---|
| 2,412,452 | 12/1946 | Green | 137/412 |
| 4,574,832 | 3/1986 | Wright | 137/426 |
| 4,646,780 | 3/1987 | Spooner | 137/426 |
| 5,084,920 | 2/1992 | Kimball | 4/665 |
| 5,106,493 | 4/1992 | McIntosh | 4/665 |
| 5,251,346 | 10/1993 | Donati | 4/665 |
| 5,307,524 | 5/1994 | Veal | 4/246.1 |

FOREIGN PATENT DOCUMENTS

| | | | |
|---|---|---|---|
| 122326 | 5/1991 | Japan | 4/665 |
| 1560617 | 2/1980 | United Kingdom | 137/412 |

*Primary Examiner*—Charles R. Eloshway
*Attorney, Agent, or Firm*—Barry G. Magidoff

[57] ABSTRACT

An electrically operated solenoid valve for use on a flush toilet tank, and capable of variable adjustment. This system comprises a float switch mounted on a calibrated bracket secured to a tank, such that the float for the float switch is mounted within the tank and the height of the float above the tank floor can be adjusted utilizing the bracket. The bracket is preferably calibrated, so as to permit variable adjustment to the height of the float within the tank. The float switch is upwardly connected to an electrically operated solenoid valve to permit water to flow into the tank when the float is below a minimum water level, and to close the valve when the float returns to the minimum water level.

4 Claims, 10 Drawing Sheets

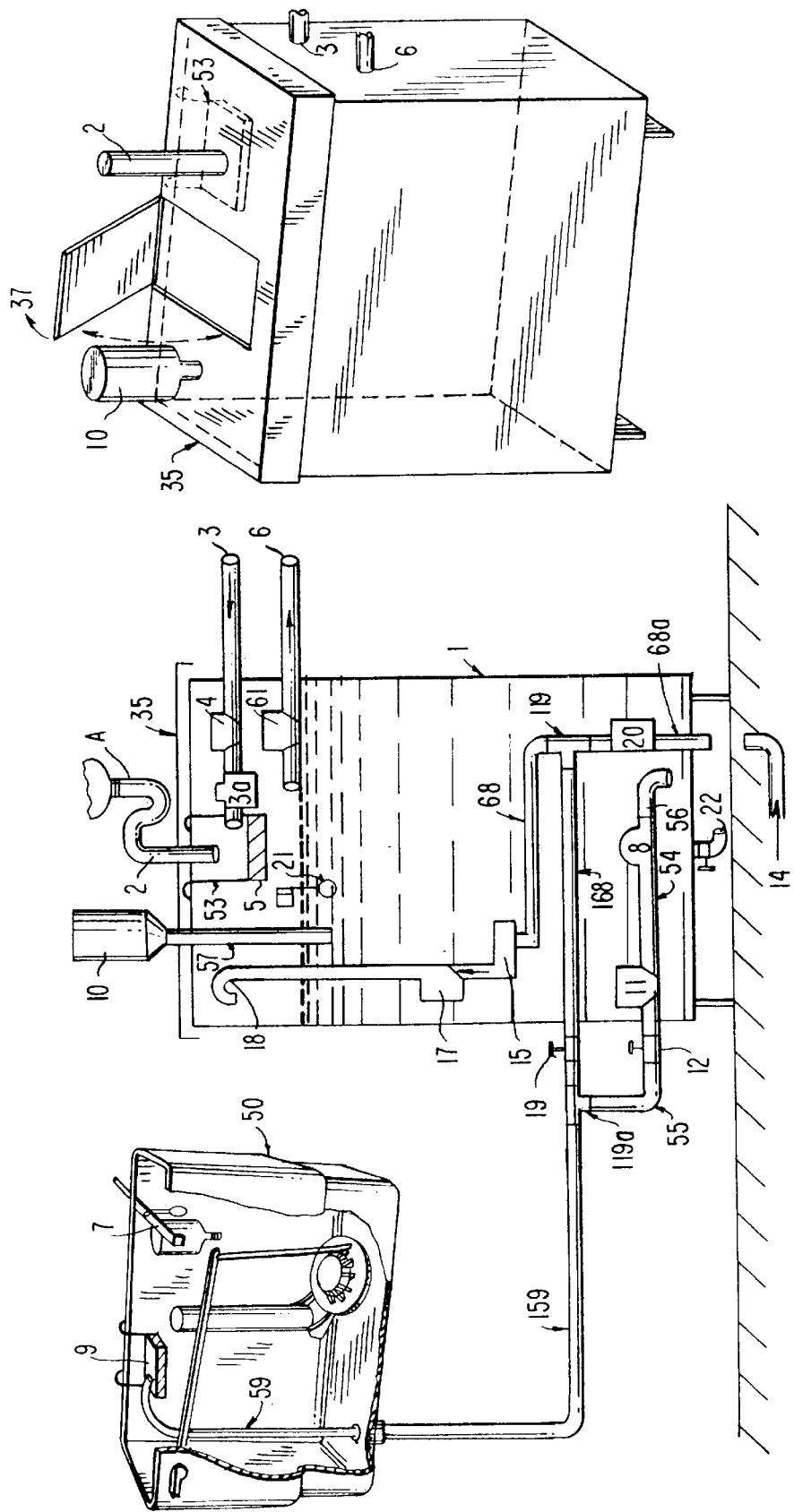

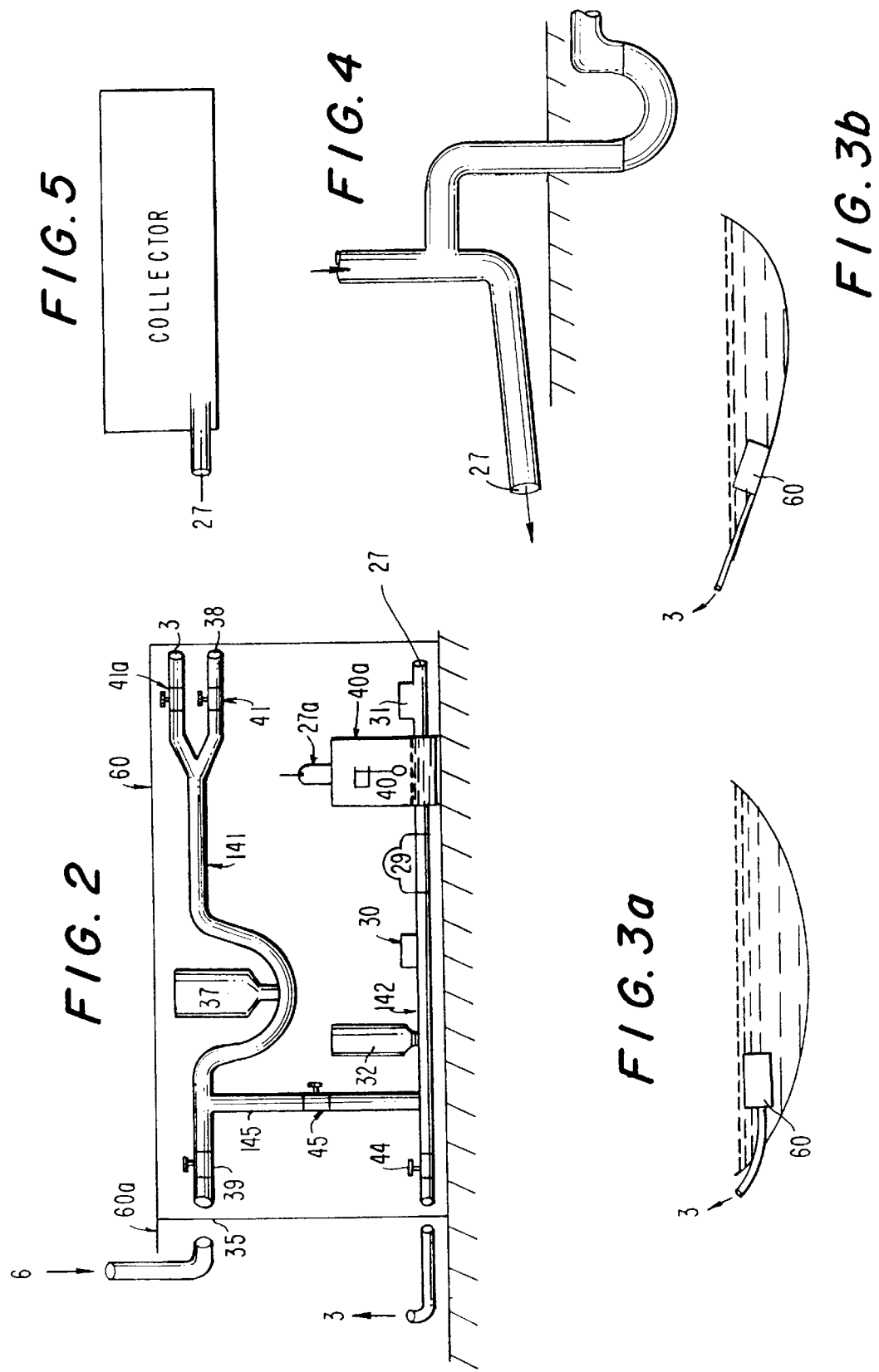

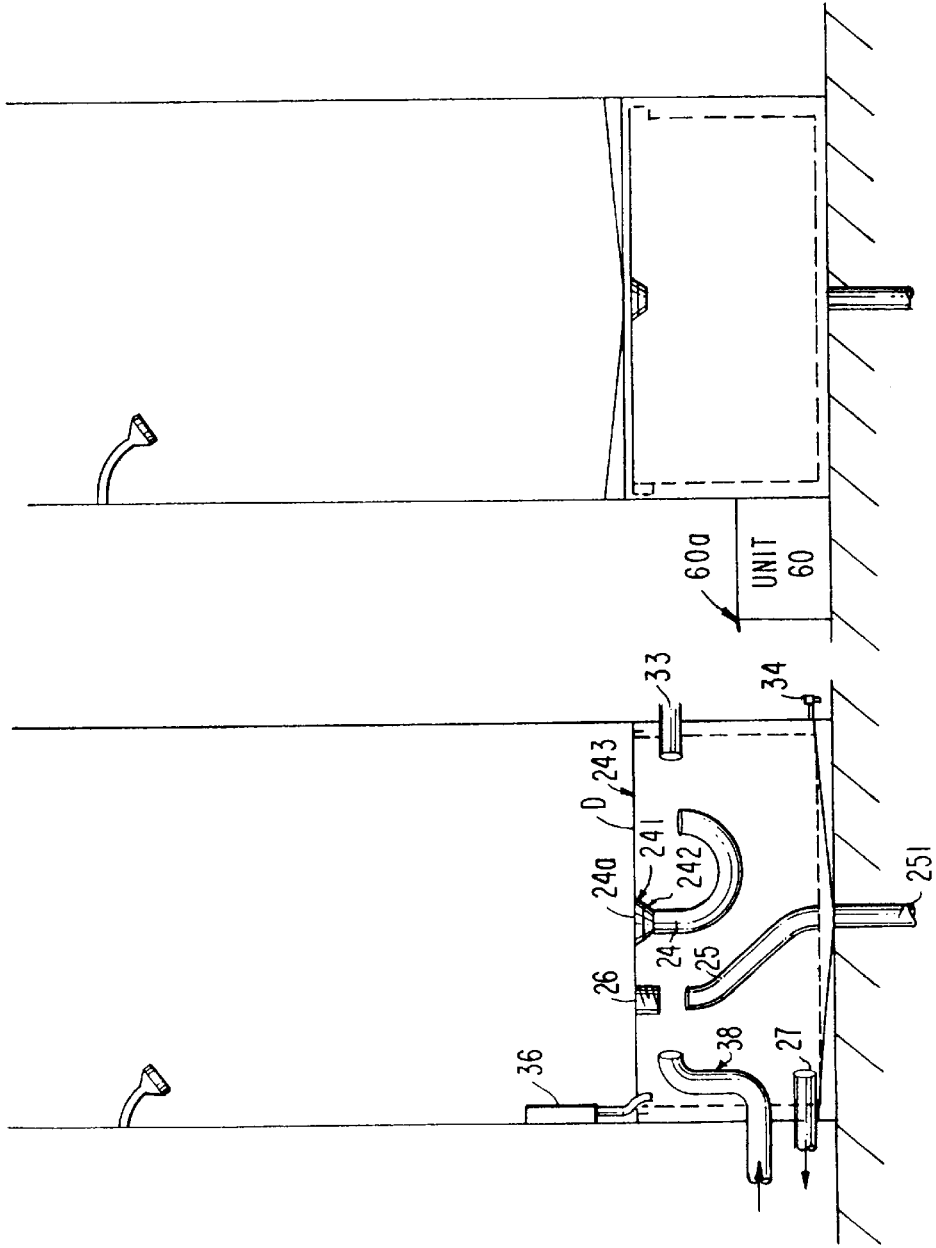

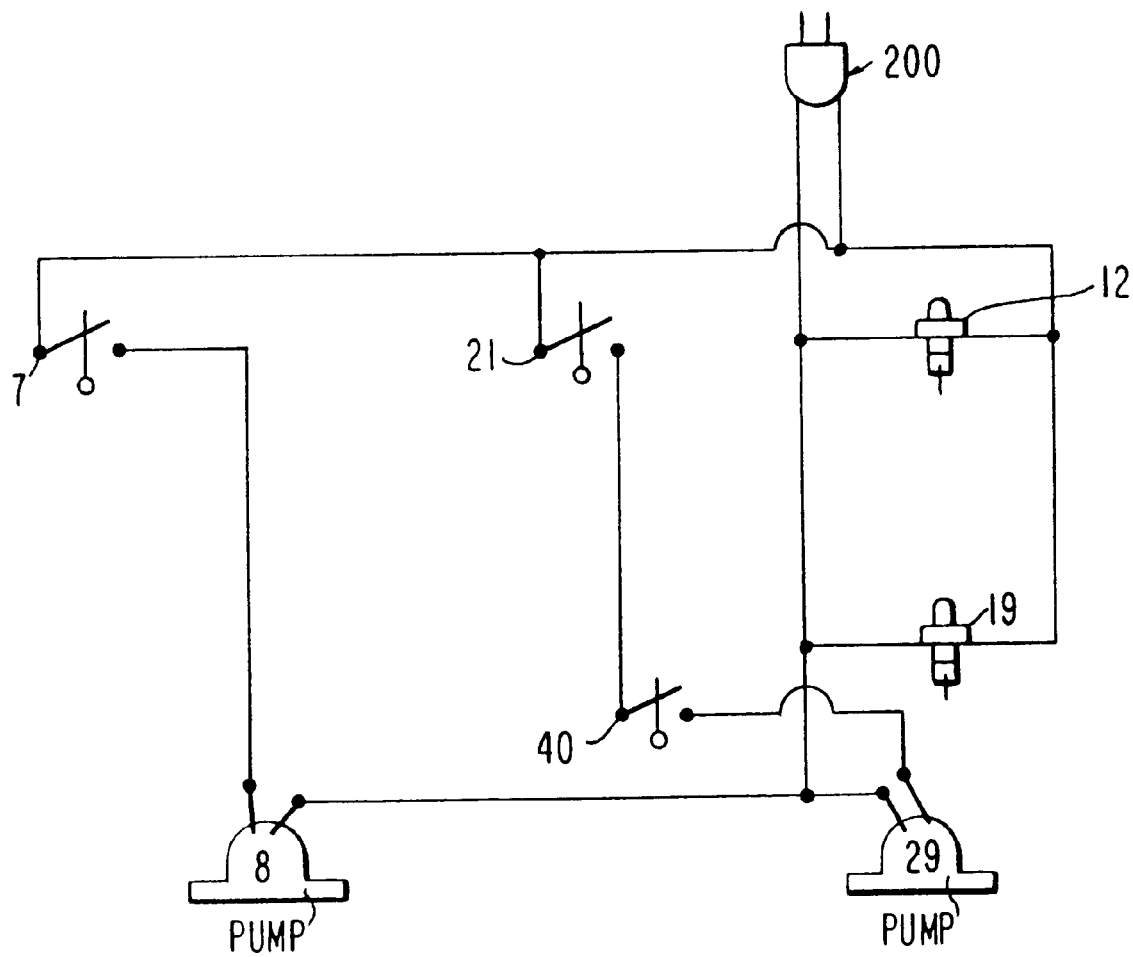
F I G. 9

ELECTRICALLY OPERATED TOILET WATER INLET VALVE SYSTEM HAVING A VARIABLE FILL LEVEL

This application is a continuation of application Ser. No. 08/227,005, filed on Apr. 13, 1994, now abandoned, which in turn is a continuation-in-part of application Ser. No. 08/134,281, filed on Oct. 7, 1993, now abandoned, which in turn was a continuation of application Ser. No. 07/978,814, filed Nov. 19, 1992, and now U.S. Pat. No. 5,251,346.

This invention relates to an electrically operated toilet tank flush valve. More particularly this invention relates to a means for filling a new or retrofitted water closet with no overflow or waste, with a variable amount of water, so as to be in compliance with local plumbing and water conservation codes.

BACKGROUND OF THE INVENTION

With the increase in global population and the vagaries of weather, water conservation has become a significant cause, not only in this country but throughout the world. It has been recognized that clean potable water be conserved and used primarily for those purposes where its qualities of cleanliness and purity are necessary, and other uses, such as the flushing of toilets, be accomplished utilizing so called "gray water". Gray water is generally defined as the "effluent" from household systems, such as household sinks and showers, laundry washing machine and dishwasher discharge. Such systems, although sufficiently contaminating the water so that its potability is compromised, do not so contaminate the water as to render it unfit for use for the flushing of toilets. Accordingly, a great many systems have been previously developed for such purposes, i.e., the recycling of such gray water for use in flush toilets.

The household plumbing systems in most modern municipalities are fully developed. One reason why gray water systems have not found greater usage is the cost of replacing the present plumbing system for one which can utilize the previously available gray water recycle systems.

Other methods of conserving water concern the elimination of the runoff or overflow of excess unused water and the use of the least amount of water feasible for flushing toilets. Such methods can be applied to fresh water plumbing systems or, preferably, for increased conservation, to gray water systems.

Ball cock valves and other mechanical valves are inefficient and waste water, for example, from leakage or imprecise filling resulting in overflows. Thus, any improvement in the valve used in flush tanks would conserve water. Electrical valves have been introduced for both the convenience and precision they afford. Such valves include U.S. Pat. No. 3,505,689 to Neff, U.S. Pat. No. 2,717,396 to Chiles, U.S. Pat. No. 4,380,835 to Yao, U.S. Pat. No. 3,090,967 to Erhardt, and U.S. Pat. No. 4,225,986 to Mauk.

SUMMARY OF THE INVENTION

It is, therefore, a primary object of the present invention to provide an improved flush valve system which would conserve water and which could be applied to a new or retrofitted plumbing system. It is a further object of this invention to incorporate said flush valve system, for additional water conservation, into an improved gray water recycling system which can be retrofit into an existing house plumbing system. It is a further object of the present invention to provide a gray water recycling system wherein the existing plumbing in an apartment, within an apartment house, need not be disrupted and wherein a compact reservoir/control unit can be maintained in even small, large city bathrooms. It is yet another object of the present invention to permit use not only of household gray water but also of natural, slightly contaminated water sources such as rain water catch basins, etc.

In accordance with this invention, there is provided signal means, designed to be connected to a sensor means in a toilet flush tank, for signaling an electrically powered pump to be turned on when the water level in the flush tank drops to below the desired flush level and to shut off the pump when the flush tank level is at its desired maximum; alternatively, the signal means can be used on a tank connected to a pressurized source of water, e.g. a city water supply, where the signal means opens a valve. The enclosure further contains automatic overflow means for removing excess water from the enclosure to the sewer drain. There is further provided a compact, fully enclosed, modular, control/reservoir unit having a volumetric capacity generally sufficient to hold an adequate water supply for the household use of a small family within its enclosure, and further containing within the enclosure an electric pump means, for pumping water to a flush tank; an inlet line, connectable to the drain outlet from a gray water supply, for example, such as the bathroom sink; an optional second inlet line connectable to a fresh water supply; and an overflow line connectable to the drain sewer line from the sink; the enclosure is also provided with a third inlet line, supplying gray water from other sources, such as: showers, tubs, rain, etc.

There are also provided means to remove, as by filtration, solids from the gray water, and disinfecting means for administering a disinfectant agent to the gray water stored within the enclosure. There is further provided optional sensor means to be placed in the control/reservoir unit to cause fresh water to flow into the control/reservoir unit whenever the available gray water is insufficient for the proper operation of the system.

As another aspect of this invention there is provided a fully enclosed slave pump unit for delivering gray water from an external source or from a secondary reservoir to the control/reservoir unit and signal means in the slave unit, designed to be connected to a sensor means in the control/reservoir unit, for signaling the pump in the slave unit to be turned on when the water level in the control/reservoir drops to below the desired minimum level, and to shut off the pump when the control/reservoir level is at its desired maximum.

BRIEF DESCRIPTION OF THE DRAWINGS

FIG. 1 is a schematic diagram showing a cut-away, side elevation view of the compact, retrofit reservoir/control unit for the gray water recycle system of the present invention;

FIG. 1a is an isometric view showing the cover of the reservoir/control unit;

FIG. 2 is a schematic diagram of a sealed slave unit in accordance with the present invention;

FIG. 3a is a sketch showing one embodiment of the slave unit in an external flood basin and;

FIG. 3b is a sketch showing a non-floating embodiment of the slave unit on the bottom of a natural body of water;

FIG. 4 is a drain connection from any household gray water source, such as: tubs, showers, washers, etc.;

FIG. 5 is a representation of an auxiliary collector means;

FIG. 6 is a diagrammatic sketch showing a retrofit shower enclosing a secondary reservoir unit in accordance with this invention;

FIG. 7 is a sketch showing another embodiment of a retrofit shower;

FIG. 9 is a wiring diagram for an electrical system of this invention.

DETAILED DESCRIPTION OF THE PREFERRED EMBODIMENTS OF THIS INVENTION

Figure 11A:
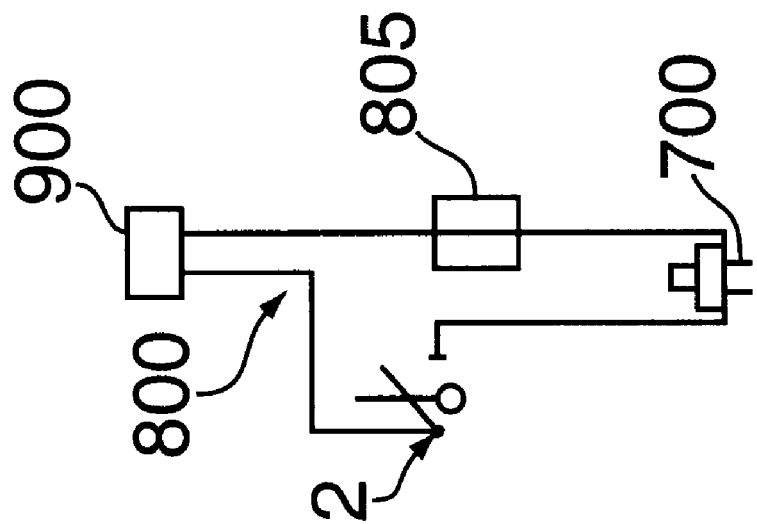
FIG. 11a is the wiring diagram of FIG. 11 with a step down transformer in the circuit.
Figure 11:
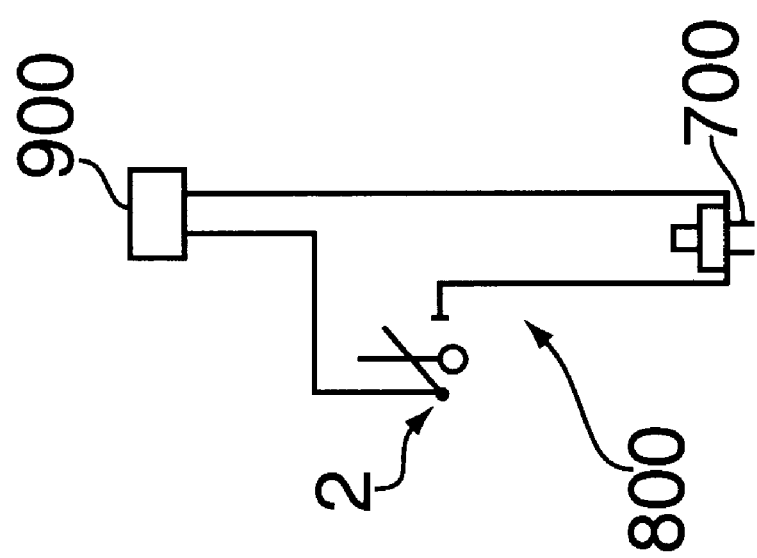
FIG. 11 is a wiring diagram for the float switch solenoid valve circuit.
Figure 12:
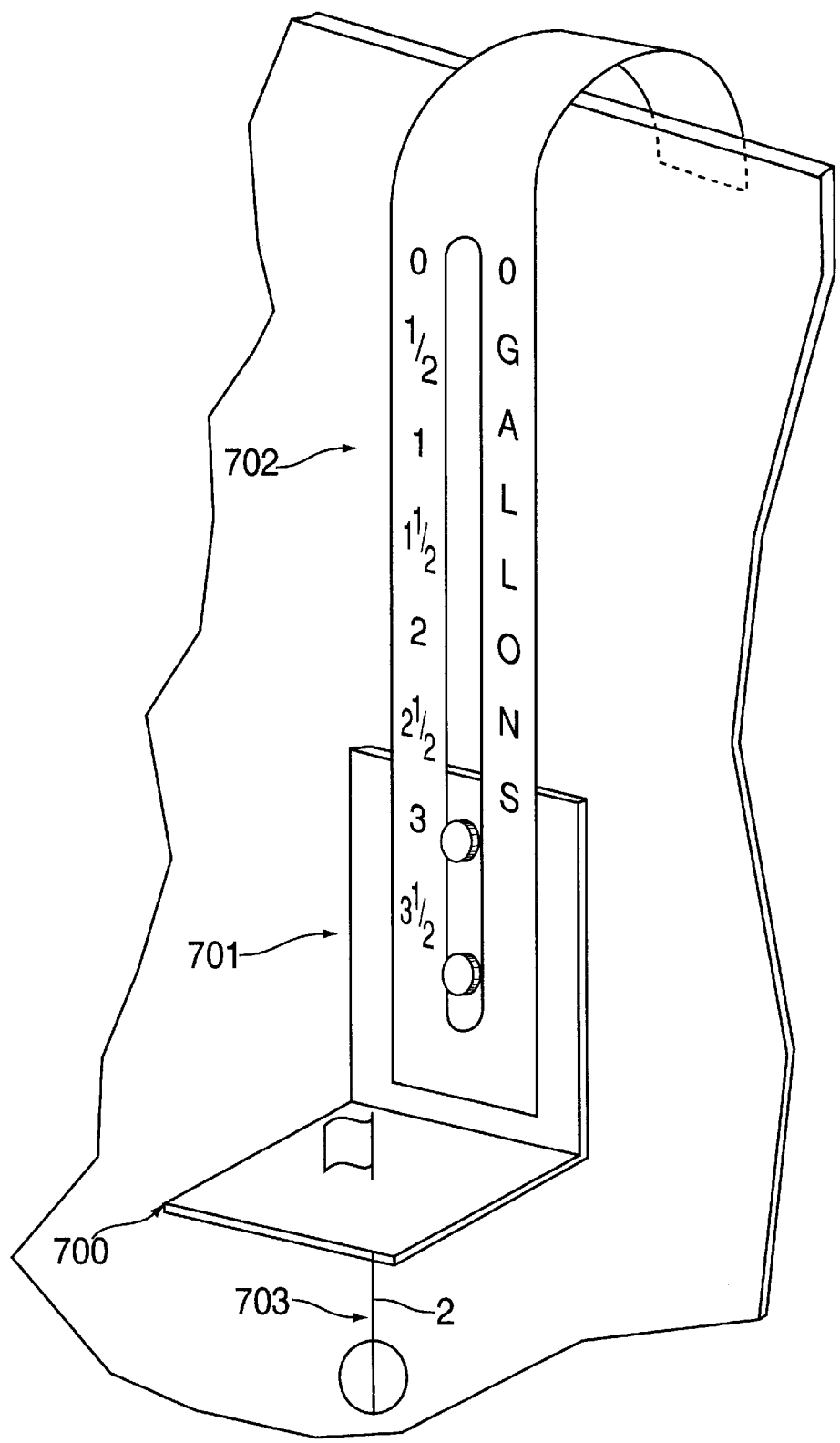
FIG. 12 is a sketch detailing the calibrated adjustable float switch unit.
Figure 13:
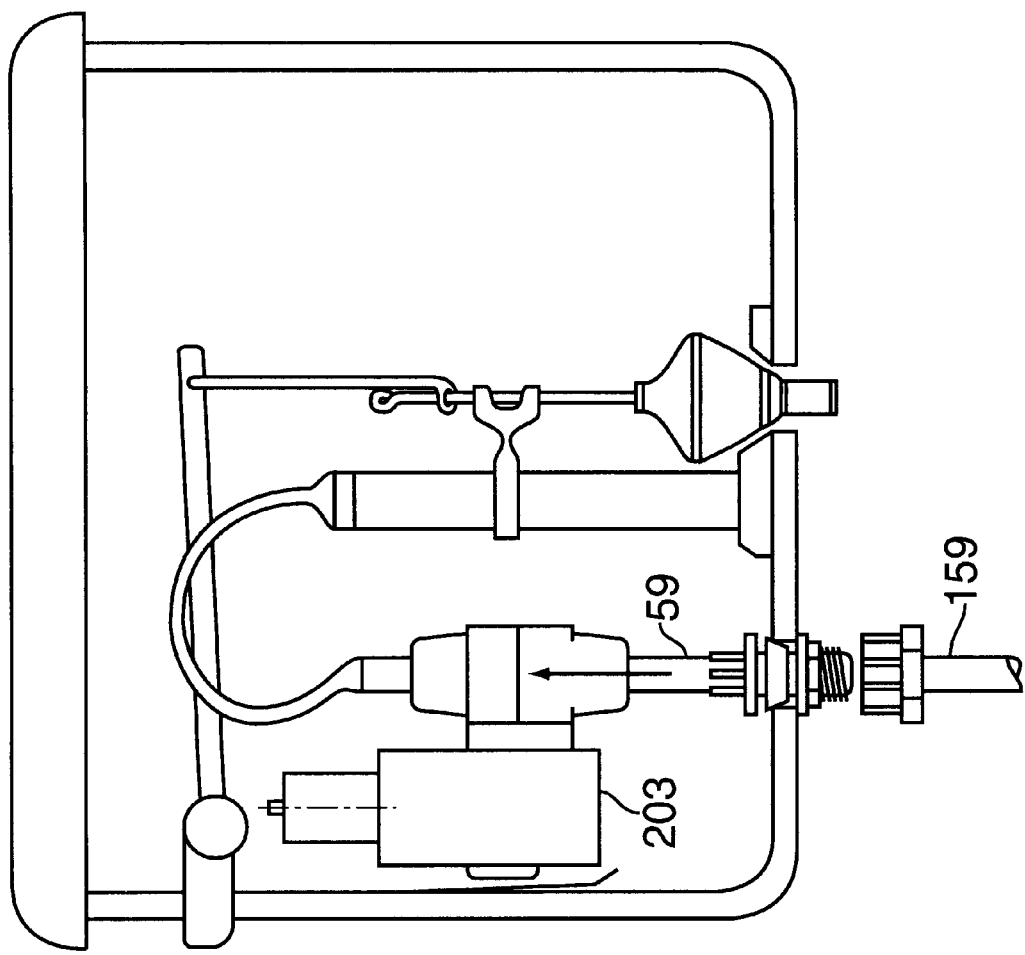
FIG. 13 is a sketch detailing a refill unit comprising a solenoid valve within a refill tube.
Figure 14:
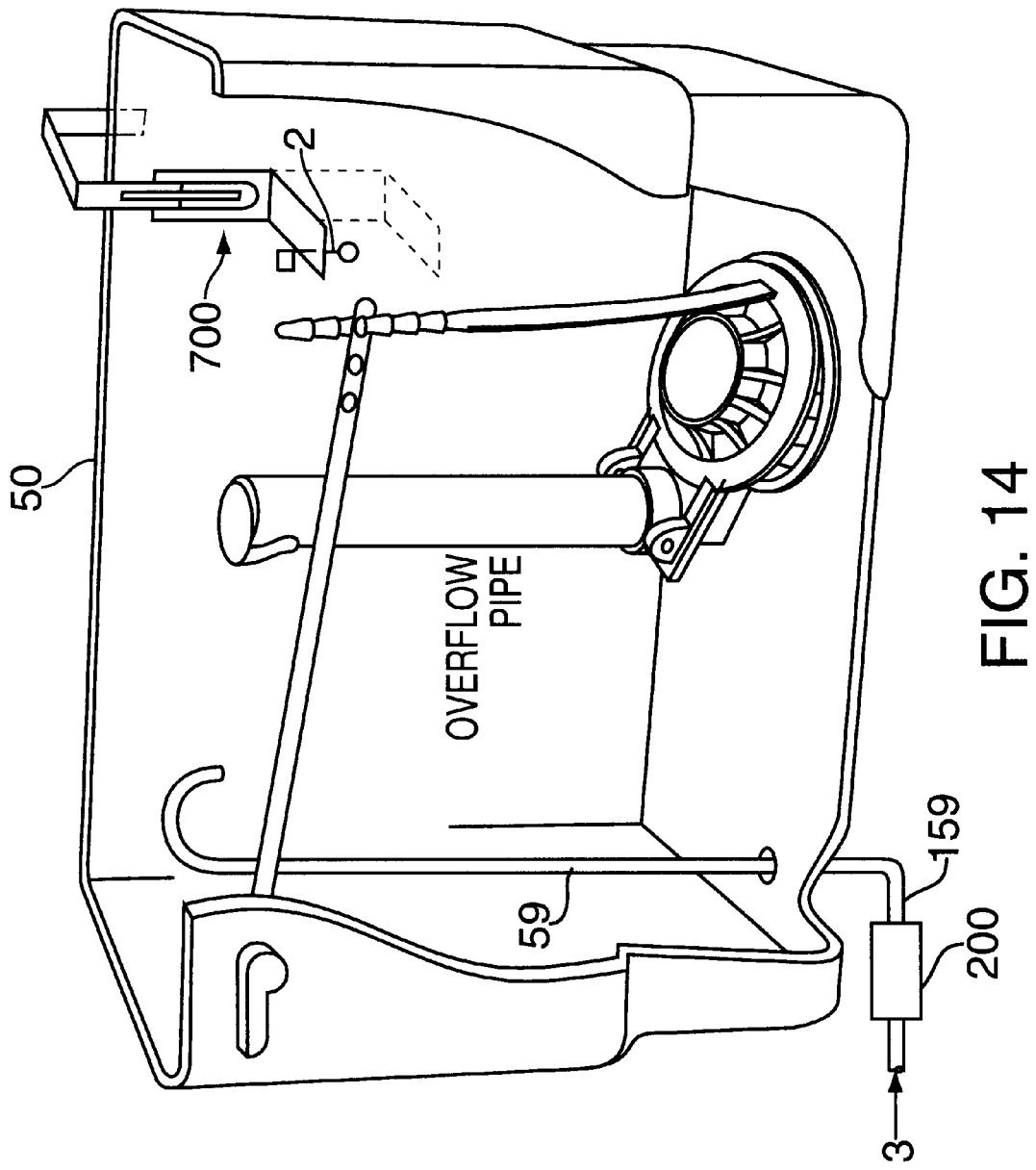
FIG. 14 is a sketch showing a flush tank fitted with a solenoid water valve situated outside the flush tank.

Referring to FIG. 14, an adjustable electrical float sensor switch unit, generally indicated by the numeral 700, is located in flush tank 50 and connected via the electrical circuit of FIG. 11, generally indicated by the numeral 800, to the solenoid valve 200. As shown in the detail of FIG. 12, the float switch unit 700 is comprised of a float switch 703 mounted on an adjustable bracket 701 which in turn is mounted on a scale 702 calibrated in gallons. The exact scale utilized is determined by the capacity and dimensions of the tank. In operation, when the toilet is flushed, and the water is emptied from the flush tank 50, the float sensor switch 703 closes, which activates the solenoid valve 200, opening solenoid valve 200 so that water flows from connecting pipe 159 through refill tube 59 and into flush tank 50. When the level of the water in the flush tank 50 reaches the desired level (to provide the quantity of water desired or required by local code, e.g. 1.6 gallons or less in New York City), the float switch 703 returns to its upper position, the solenoid valve 200 is closed and water flow is discontinued from the connecting pipe 159. The flush tank is filled to a predetermined level, measured in gallons, dependent upon the position of the adjustable bracket 701 of the float switch unit 700. A one inch lowering of the bracket 701 would conserve about ½ gallon of water with each flush of water in a typical flush tank in an apartment dwelling. The exact movement required of the bracket 701 to conserve a given amount of water depends upon the capacity and the dimensions of the flush tank 50. The electrical float switch solenoid valve circuit of this invention is suitable for inclusion in a newly installed flush tank or can be retrofitted into existing flush tanks.

Figure 10:
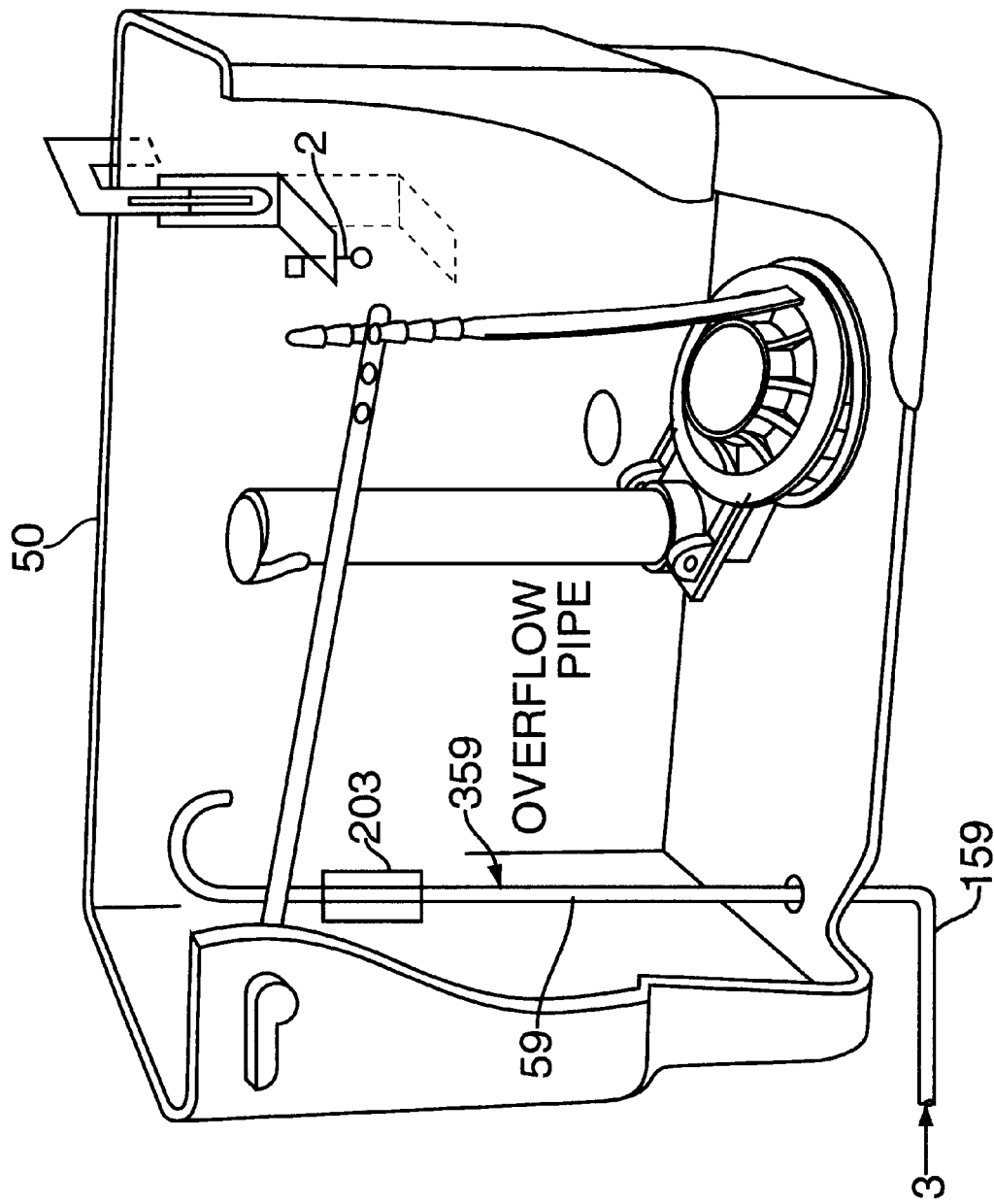
FIG. 10 is a sketch showing a flush tank fitted with an adjustable electrical float switch unit and a solenoid water valve situated inside the flush tank.

In the preferred embodiment of the invention, the refill tube 59 is replaced by a refill unit 359, e.g. as in FIG. 10, comprising the refill tube 59 and a waterproof solenoid valve 203 located therein. This unit 359 is easily retrofit in existing flush tanks in place of the preexisting refill tube. The float switch solenoid valve circuit is powered by any suitable electric power source 900, e.g. 110 or 220 volt, AC or DC, or batteries.

In its preferred embodiment, for safety, a step-down transformer 805 is placed in the float switch solenoid valve circuit and the electrical float sensor switch unit is plugged into a ground fault current interrupter socket. As an additional precaution, an independent backup power supply means, such as a suitable commercially available rechargeable battery pack, is placed in the circuit to automatically supply power in the event of a power failure of the primary power source. For convenience, the rechargeable battery pack can be continuously maintained by trickle charge, for example from the step-down transformer.

Alternatively, the signal means, e.g., the float switch unit 700, can be connected to the pump 8, in the system described below, to turn the pump on, to bring the recycled gray water into the tank.

An example of a useful float switch for this invention is a commercially available switch identified as Madison model M8000, which can readily be attached to the movable bracket 701. A useful solenoid valve, also commercially available, for incorporation into the system of this invention, is identified as ASCO Red Hat II, Catalog number EF 8210G93-6P.

Referring to FIG. 1, a self-contained gray water recycling unit, generally designated by the numeral 1, is in fluid flow connection with a toilet flush tank generally designated by the numeral 50. The self-contained recycling unit 1, includes a removable cover 35 to permit access into the unit for major repairs. The recycling unit is sized so as to fit within the average size bathroom, being approximately the same size as the usual clothes hamper. The dimensions for this unit are approximately 14 inches by 24 inches by 22 inches in depth and will thus hold approximately 32 gallons, or more than 12 toilet flushes at 2½ gallons/flush. A gravity feed port 2 is connected to the usual sink drain line with a trap, shown as "A". The self-contained unit 1 can fit directly beneath the sink, or to one side. The port 2 is towards the upper end of the unit 1, generally above the maximum water level indicated by "C".

Figure 8:
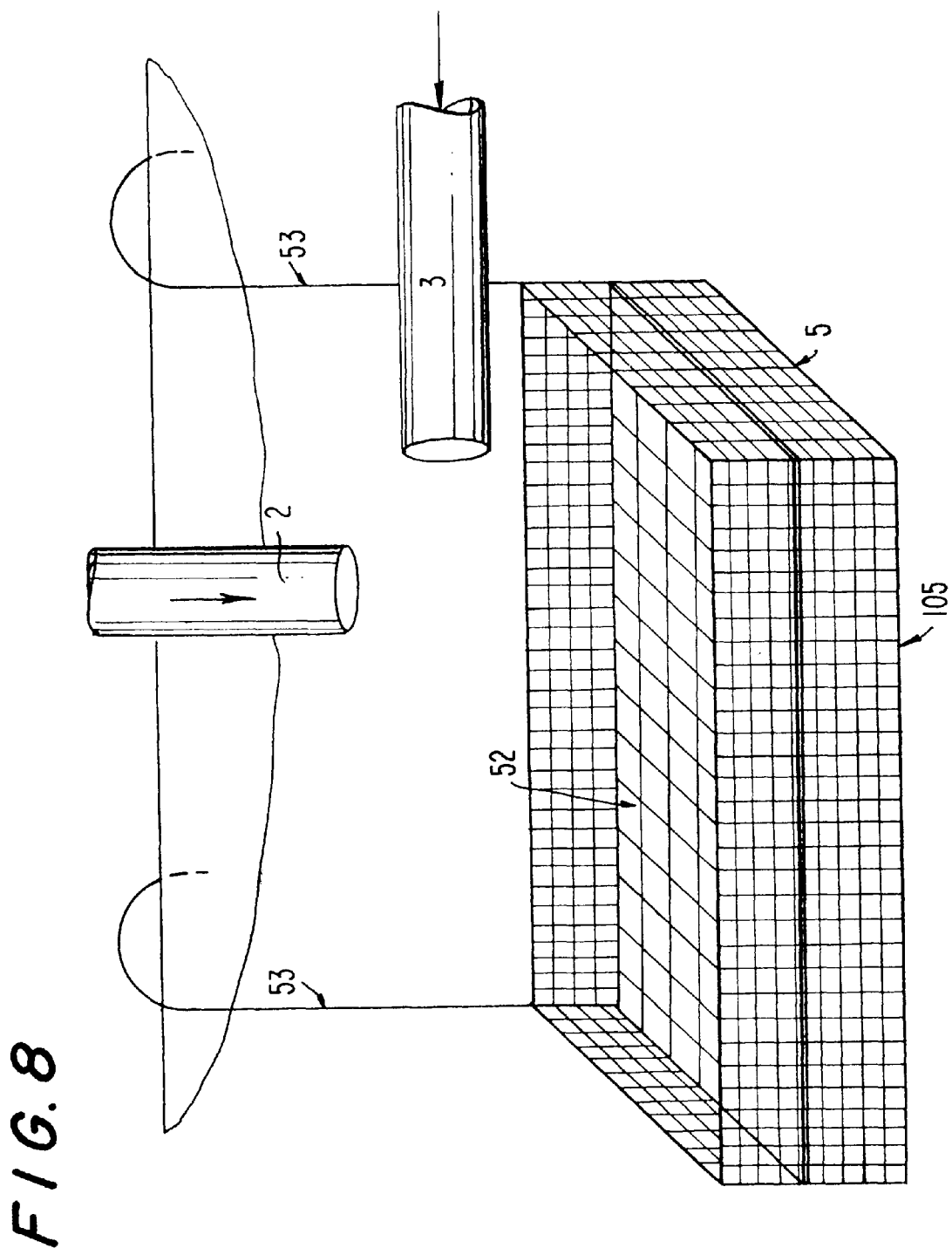
FIG. 8 is an enlarged isometric view, of a filter basket used in this invention to remove solids from gray water and to hold a disinfecting agent.

Immediately below, and in the direct path of the flow from the gravity feed port 2, is a removable metal screen filter basket 5, detail FIG. 8. The basket comprises an outer unit wherein the bottom and sides are formed of a fine mesh screen 105, with a removable inner floor 52 formed of a medium mesh screen. Intermediate the medium mesh 52 and the fine mesh bottom 105 is a space to hold solid disinfectant material, for example, the common chlorinating tablets used for swimming pool disinfecting. The medium mesh 52 fits within the fine mesh box 5. The fine mesh box 5 is suspended by wires 53 from the side of the container 1 so as to be located directly beneath the main inlet port 2, such that all water flowing from the port 2 passes through the mesh basket S to remove the larger solid particles and also to begin the disinfecting of the water to prevent the generation of odors during standing of the water in the reservoir.

An alternate entry port 3 is also located so as to cause water to flow into the mesh basket 5 through a check valve 4 and a removable in-line filter 3a. Port 3 is connected to a slave pump unit 60 (FIG. 2) or to another secondary source of gray water, located at a higher elevation. An overflow port 6, also including a check valve 61, maintains the water level in the recycle unit 1 at or below the maximum level C for most efficient operation, and to prevent overflow of the unit onto the floor. The overflow port 6 can be connected to the sewer line, preferably through a trap (not shown), or can be connected to a secondary reservoir unit, if such is available. The importance of maintaining a relatively clean and odor-free supply of water makes it preferable to provide additional means to directly disinfect the reservoir water, including administering a chlorine solution in liquid form, such as from a drip bottle 10 having an automatic dispensing spout 57 extending into the self-contained unit 1.

In operation, the gray water from the self-contained unit 1 is passed to a toilet flush tank, for example the tank shown by the numeral 50, through the outlet pipe 54. A pump, e.g. a sump-type pump 8, mounted on the outlet pipe 54 within the unit 1, brings water from the reservoir 1 through the pipe 54 and out to line 55 through the solenoid valve 12. An in-line filter 56 is located within the pipe 54 to prevent any solid debris from entering and clogging the pump 8.

The pre-existing fresh water line 14 is connected to the recycle system through a one way check valve 20, to prevent any back flow into the potable water system. Generally the solenoid valve 19, in flow connection with the fresh water line 68*a* and the flush tank 50, is maintained closed and solenoid valve 12 is open, during normal operation. Inside unit 1, a water pressure-sensitive, automatic valve 15 (for example, the refill valve sold by Fillpro Products, Inc., of Greensburg, Ind.) is connected in-line between pipe 68, and tube 18. When the water level in the control/reservoir unit 1 falls below a predetermined minimum level and there is no new supply of gray water, pressure valve 15 will allow for the flow of fresh water through pipe 14, pipe 68*a*, check valve 20, T-joint 119, pipe 68, check valve 17, and through refill pipe 18 into the reservoir unit 1. Solenoid valve 19 is in the closed position, during powered operation. Pipe 18 terminates at a point above the maximum water level C, so as to prevent any back flow of the gray water into the potable water line 14. Valves 19 and 12 are of the solenoid types and are biased so as to move into the respective opened or closed position, upon the event of a power failure. Specifically, in the event of a power failure, the toilet flow valve 19 is biased open, and the reservoir flow valves 12 is biased closed, such that fresh water is permitted to pass into the flush water tank 50, when the pump 8 is disabled by such power failure. These two valves are connected to the exterior of the unit 1.

The modular unit 1 is prewired, and the pump 8, the two solenoid valves 19, 12 and the float valve 21, the electrically powered elements, can be merely plugged into a power tap in the house electricity, as shown in FIG. 9. The self-contained unit 1 also contains a manually operated drain cock 22, which may also be connected to a sewer line, not shown.

In its simplest form, the self-contained unit 1 operates independently and can be placed in a pre-existing bathroom facility, for example, placed directly beneath a bathroom wash basin, and connected into two preexisting household plumbing lines:

In this system, the unit 1 receives water directly from the wash basin through the basin drain pipe A, which is directly connected with the inlet pipe 2, from which the water flows through the mesh basket 5 over the solid disinfectant material. The basket 5 can be removed for cleaning, i.e., to remove any solid waste materials passing from the inlet 2 and to replenish the disinfectant material held between the two mesh layers. For ease of access, a hand port 37 is located within the top cover 35. The hand port 37 is removable, or hinged, and thus obviates the need to remove the entire top 35. The hand port 37 is large enough to remove the wire basket 5 through the top.

The unit can be connected into the usual water supply to a toilet tank by connecting pipe 159, to flush tank 50, to the open arm of the Tee 119*a* and the conventional fresh water line 14 is connected to pipe 68*a*.

In operation, when the toilet is flushed, and the water is emptied from the flush tank 50, the float switch 700 closes, which activates the pump 8, which pumps the gray water from the reservoir unit 1, through lines 54, 55 and 159, through the refill tube 59, and through another disinfecting mesh basket 9, also containing disinfecting pellets. When the flush tank 50 receives the necessary additional water, and the float switch 700 returns to its upper position, the pump 8 is shut down and water flow is discontinued from the unit 1. In the event there is excessive water flow from the wash basin through inlet 2, with insufficient toilet flushing activity, the water in the reservoir unit 1 may reach a level above the maximum level "C". At this point, the water directly flows outwardly through the overflow line 6, e.g., directly to the sewer line through a trap (not shown). The disinfectant bottle 10, set to deliver the desired rate of liquid disinfectant into the tank unit 1, can be removed and a new bottle screwed in place, when empty.

It is noted that one of the advantages of the system of this invention, is to eliminate the usual problems with the Babcock valve in the toilet tank. However, if desired the Babcock valve, or equivalent, can be retained for use in the event of a power failure; but, the undesirable inefficiencies of the Babcock valve, which are generally recognized to be the continuing loss of water by way of leakage, are eliminated, except during a power failure. In case of a power failure, disabling pump 8, the solenoid valves reverse their open and shut positions: valve 12 is designed to close, and valve 19 is designed to open when power is shut off. The fresh water will be directed through pipe 14, pipe 68*a*, check valve 20, pipe 168, valve 19 through line 159 and into the water closet 50; the toilet will operate as it did before the installation of the water recycling system of this invention.

In a more complex and larger system, for example as would be used in a home, as opposed to an apartment, or in a new installation in an apartment building, a secondary unit can be located outside of the immediate toilet facility to serve as a reservoir. For example, such a secondary unit can be useful for an entire apartment building, or to utilize external water sources, such as run off from rainfall. Such a secondary sealed unit is shown in FIG. 2, and is generally indicated by the numeral 60.

Alternatively, the secondary unit 60 can be connected to a simple collector box, as shown in FIG. 5, which is a simple holder for gray water run-off from any source. As a further alternative, the secondary unit 60 is connected directly to a gray water drain line, such as from a shower (as shown in FIG. 4), where the inlet to the secondary unit is teed into the drain. This permits taking a portion of the run-off, as needed, without the need to provide for a separate overflow means if the gray water flow is too high.

The secondary unit 60 is generally required when an external, larger source of gray water is available. One example of a larger gray water source which can also be a retrofit reservoir connected to a shower, is shown in FIGS. 6 and 7.

When an auxiliary gray water source is used, i.e., water that must be pumped into unit 1 rather then gravity fed water, it is necessary to utilize the secondary unit 60 of FIG. 2. This secondary unit 60 can pump gray water into unit 1, either from a secondary reservoir, as FIGS. 5, 6 and 7, a pond, as FIGS. 3*a* and 3*b*; or, directly from the drain or other source of gray water, such as a shower, tub washer, etc., as FIG. 4. Also, unit 60 can handle any excess gray water from unit 1 and pump it into other reservoirs, e.g., reservoir D. of FIGS. 6 and 7.

When the water level in unit 1 falls below a predetermined level, the electrical switch 21, which is located in unit 1, together with an electrical float switch 40, which is located in unit 60, activate pump 29, which is also located in unit 60. The float switch 40 permits the pump 29 to be activated only when there is water flowing through the filter 31 into the float chamber 40a, to avoid damage to the pump 29. Auxiliary gray water is pumped through inlet pipe 27 into pipe 142; through in-line filter 31, which can be removed and replaced or cleaned to again prevent excess collection of solid material; through float switch chamber 40a; through check valve 30; and through flow valve 44, and out through connecting pipe 3 into unit 1. Preferably, the float chamber 40a is sealed to avoid overflow into the chamber 60; the sealed chamber 40a requires a vent valve 27a to be installed, to prevent air blockage in the chamber. The screw-in liquid disinfectant container 32 provides further disinfecting for any flow through pipe 142.

When the water level in unit 1 reaches a predetermined level, the electrical float switch 21 will shut off and pump 29 will stop pumping. Flow valve 45, located on pipe 145, is in the closed position. Flow valve 44 may be shut off when the replacement of disinfector 32 is needed. Preferably the switch chamber 40a is sealed to avoid overflow into the chamber 60. The sealed chamber requires an air vent 27a.

When unit 1 is used in conjunction with a secondary reservoir, i.e., reservoir D, and there is excess of water in unit 1, it can be diverted, through unit 60 and held in that secondary reservoir to be used when needed. The overflow water flows through overflow pipe 6, and by gravity, through inlet 135 into pipe 141 in unit 60. When the flow valve 45 is in the closed position, the excess water flows through flow valve 39, which is in the open position, through flow valve 41, also in the open position, and enters the reservoir, i.e., unit D, through inlet pipe 38. (Both flow valves 39 and 41 can be closed so that the disinfectant dispenser 37 can be replaced.) Valve 41a is in the closed position (when open, it allows for distribution of gray water into unit 1 if a secondary reservoir is not included in the system). The liquid disinfectant dispenser 37 screws into the trap to provide further disinfecting for any flow through the outlet pipe 141.

When the system does not include another reservoir, but the gray water is pumped directly from the drain from the gray water source, i.e., as in FIG. 4, and extra disinfectant is warranted, then the valves 41, 44 and 39 of unit 60 are closed and the other valves 45 and 41a are open. The gray water is pumped through pipe 27, into pipe 142, then pipe 145 and pipe 141; and then through valve 41a into the inlet pipe 3 and into unit 1, through mesh basket 5.

Unit 60 can be installed in the bathroom, kitchen, etc., and, as shown in FIGS. 3a and 3b, the control unit 60 can be made either buoyant (FIG. 3a) or non buoyant (FIG. 3b) and immersed into an external source of water, for example, an outdoor pond or rain water catch basin.

The secondary reservoir D can be installed on the shower floor of an existing shower stall, FIG. 6, as a retrofit. In a new shower installation, it can be installed on the bathroom floor, and the new shower could be installed on top of the reservoir, i.e., in FIG. 7 as a new installation.

When retrofitting, e.g., a shower stall, two removable metal strainers 241, 242 are located in the new drain opening 24a, through the elevated floor 243. The original drain pipe 251 in the original floor, is extended upwardly by the overflow pipe 25, to a level which is the desired maximum water level in the reservoir D. Directly above the overflow pipe 25 is a water-tight screw cap 26, a hand hole cover, which permits access to the original drain to permit clearing of the drain, if such becomes necessary. The air space provided above the top of the elevated overflow pipe 25 is necessary in order to assure proper water flow and to maintain a layer of oxygen above the water. The new floor surface 243, can be removable, or hinged as desired, to simplify access to the reservoir space, as for regular cleaning. A drip type chlorinator/disinfectant bottle can be held in the disinfecting unit 36 for regulated gravity feed into the reservoir D. The disinfectant unit 36 can be refilled or replaced as desired. For draining the reservoir during occasional cleaning, it is preferred that the pipe 25 be removable from the drain pipe 251, permitting all of the water in the space D to flow down to the sewer. Alternatively, the volume can be drained through a stopcock 34. The shower stall unit D can be used as the sole reservoir in a retrofit bathroom, but it is preferably used as the secondary reservoir in combination with the hamper size unit 1. When used alone, a pump and the other electrical elements must be included in the reservoir D.

When used as the primary bathroom reservoir, the drain line from the wash basin can also be connected, through a pipe 38. In addition, water from outside sources can be provided through an alternate inlet 33.

In order to provide ease of maintenance, as well as greater convenience, a separate control/power unit is provided, designated by the numeral 60, which can be, for example, as shown in FIG. 7, provided as an external step for ease of entrance into the elevated shower floor. The details of the separate control unit 60 are shown in FIG. 2, and comprise an external box 60a of which can provide the step surface. The secondary inlet 38 into the reservoir is connected to a flow pipe 141 in the external control unit 60, and flow is controlled by valves 39 and 41, in the open position and valves 45 and 41a in the closed position, for regulating the direction of flow.

The purpose of the inlet pipe 38 is to direct the overflow from unit 1, through outlet 6, so that the excess water in unit 1 will flow to the secondary reservoir, i.e., D, rather than drain out through the sewer system.

In the operation of this invention, the simple retrofit reservoir control unit 1 receives water by gravity flow from, e.g., a wash basin, through the drain line 2. The water passes over and through the filter basket 5 to remove at least the larger solids. When the toilet 50 is flushed, and the water in the tank 50 drops to below the level selected on float switch unit 7, the float switch 700 activates the pump 8, causing water to flow through line 54, initially passing through a fine filter 56, to prevent particles from clogging the pump 8, through the check valve 11 and the gray water solenoid valve 12, a line 55, a line 159, and into the toilet tank 50 through the refill tube 59. The flow from refill tube 59 passes through a further mesh basket 9, which encases preferably a disinfectant cake to prevent mildew growth within the toilet tank 50. If the water level in the primary reservoir 1 drops to below a minimum level, i.e., a level below the level sensed by the float switch 21, which may occur if insufficient feed gray water is provided from the basin inlet, or from the secondary inlet 3, as sensed by the pressure sensitive valve 15, the valve 15 will automatically open, and permit fresh water to flow through line 14; into line 68a; check valve 20 insures that no water is back flushed into the fresh water line 14; through pipe 68; and check valve 17 which is mounted on the fresh water line 18; and into unit 1. As a further safety feature, the fresh water inlet 18 is located above the maximum water level in the tank 1.

If the water level in the reservoir unit 1 reaches a level above the desired maximum "C", the level at which the overflow pipe 6 is situated, water flows by gravity either to a drain with trap, not shown, or to a supplemental reservoir, such as reservoir D, shown in FIGS. 6 and 7. A further check valve 61 also prevents backflow through outlet 6.

When the reservoir unit 1 is in fluid-flow connection with a secondary gray water reservoir, such as the shower unit D, via the secondary control unit 60, shown in FIG. 2, a drop in the water level of reservoir 1 to below a minimal level, as determined by float 21, will activate the refill pump 29 in the slave unit 60. However, if there is not enough water in the secondary reservoir to fill the control unit to a predetermined level, the water level will continue to drop until pressure valve 15 opens to permit a minimum amount of fresh water through pipe 14 as indicated earlier.

The water recycling system of the present invention is formed from conventional parts and components. The flow pattern can be varied to cope with a variety of different situations, factors, and circumstances, providing wide flexibility in function. The various modules can be combined to meet widely varying needs.

The patentable embodiments of this invention which are claimed are as follows:

1. An electrically operated toilet tank flush valve system comprising a flush toilet tank, a flush water inlet line in fluid flow connection with the tank, a solenoid valve in fluid flow connection between the inlet line and the tank, an adjustable, calibrated water level signal means disposed within the tank and in operating electrical connection with the solenoid valve in response to a decrease in water level in the toilet tank to below an adjustably designated level, the solenoid valve being designed to open in response to a signal received from said water level signal means when the water in the tank is below a set level, the signal means is adjustable to broadcast the signal according to different levels of water in the tank; the water level signal means comprises an adjustable support member supported within the tank and a float switch mounted on the adjustable support member, the float switch comprising a float and a switch, the float switch being so designed to generate the signal when the water level within the tank is below the set level, the adjustable support member permitting vertical movement of the float to permit setting a desired water level within the tank.

2. The electrically operated toilet tank flush valve system of claim 1, further comprising a refill tube extending into the tank and adapted to be connected at one end to an inlet line from a water source and the second end being open into the tank, and wherein the solenoid valve is located within the refill tube.

3. The system of claim 1 wherein the solenoid valve is biased closed in the absence of an electrical signal from the signal means.

4. The system of claim 1, wherein the solenoid valve is an inlet valve located outside the tank.

* * * * *